United States Patent
Bent et al.

(10) Patent No.: US 7,777,676 B2
(45) Date of Patent: Aug. 17, 2010

(54) METHOD OF LIGHTNING LOCATION USING TIME DIFFERENCE OF ARRIVAL TECHNOLOGY WITH AUTO CORRELATION

(75) Inventors: Rodney B. Bent, Melbourne, FL (US); Robert T. Davis, Melbourne, FL (US)

(73) Assignee: TOA Systems, Inc., Melbourne, FL (US)

( * ) Notice: Subject to any disclaimer, the term of this patent is extended or adjusted under 35 U.S.C. 154(b) by 0 days.

(21) Appl. No.: 12/171,319

(22) Filed: Jul. 11, 2008

(65) Prior Publication Data
US 2010/0007558 A1 Jan. 14, 2010

(51) Int. Cl.
G01S 3/02 (2006.01)
G01S 5/04 (2006.01)
(52) U.S. Cl. .................................. 342/465; 342/442
(58) Field of Classification Search ................ 342/442, 342/451, 453, 463–465; 455/456.1, 456.6, 455/457
See application file for complete search history.

(56) References Cited

U.S. PATENT DOCUMENTS

| | | |
|---|---|---|
| 4,543,580 A | 9/1985 | Bent et al. |
| 4,792,806 A | 12/1988 | Bent et al. |
| 4,812,852 A | 3/1989 | Bent et al. |
| 4,915,455 A | 4/1990 | Bent et al. |
| 7,342,972 B1 * | 3/2008 | Giannakis et al. ........... 375/259 |
| 2003/0142017 A1 * | 7/2003 | Rabinowitz et al. ......... 342/458 |

* cited by examiner

*Primary Examiner*—Dao L Phan
(74) *Attorney, Agent, or Firm*—Fox Rothschild, LLP; Robert J. Sacco

(57) ABSTRACT

There is disclosed a system for identifying a source location of an electromagnetic signal having a known waveform. Radio receiving equipment located at three of more monitoring stations receives and demodulates a radio frequency signal from a common source. A time stamp generator applies a time stamp to each block of N digital data samples derived from the received radio frequency signal at each monitoring station. A GPS timing signal can be used to synchronize the time stamp generator in each monitoring station. Further, replica generating hardware and/or software at each monitoring station periodically synchronously generates a replica waveform. An autocorrelation processor at each monitoring station determines a time offset between an occurrence of the known waveform in the signal, and an occurrence of the replica waveform at each monitoring station. The system also includes communication devices at each monitoring station for communicating the time offset from each monitoring station to a central processor which calculates a position of the source location using the time offset communicated from each monitoring station.

21 Claims, 3 Drawing Sheets

US 7,777,676 B2

METHOD OF LIGHTNING LOCATION USING TIME DIFFERENCE OF ARRIVAL TECHNOLOGY WITH AUTO CORRELATION

BACKGROUND OF THE INVENTION

1. Statement of the Technical Field

The inventive arrangements relate to methods for determining the location of lightning strikes, and more particularly, methods for locating such lightning strikes using time difference of arrival techniques.

2. Description of the Related Art

A variety of systems and methods have been developed for identifying the occurrence and location of lightning strikes, such as ground strokes. Most such systems identify the occurrence of lighting based on characteristic electromagnetic energy patterns that are associated with lightning strikes.

Several different methods can be used for determining the location of lightning strikes. One such method employs a time-difference-of-arrival (TDOA) discrimination scheme. Systems using this method typically include three or four monitoring stations that are geographically separated by some distance. Each station includes a lightning stroke detector and a timing signal generator that is synchronized with the timing signal generator at each other respective detection location. When a lightning stroke occurs, the time of detection of the ground stroke is recorded at each station. This timing information is communicated from each of the monitoring stations to a central processing station. By using timing data from each monitoring station, the location of the lighting stroke can easily be determined. For example, in the case where four monitoring stations are used, an algorithm for determining the location of the ground stroke is fairly simple, being reduced to the solution of a set of linear equations.

In general, the accuracy and resolution of TDOA type location systems are traded off to reduce the amount of data passed over the communication link. For example, a high degree of accuracy could be obtained if electromagnetic waveforms were demodulated at the remote monitoring stations, and the entire digitized signal was forwarded to a central processor system to compute the time of arrival (TOA) for each monitoring station. A generalized cross-correlation method can be used at the central processor to compute the TDOA values associated with each monitoring station. Still, there are drawbacks to such an approach. The accuracy of a TDOA estimate in such a system would be completely determined by the effective signal-to-noise ratio (SNR), signal time duration, and signal bandwidth. Thus, large amounts of bandwidth are required for transmission of data to fully represent the entire digitized signal from the monitoring station, to the central processor.

From the foregoing, it will be appreciated that the tradeoff between accuracy and communication link bandwidth is a significant issue in the design of TDOA type signal location systems. Accordingly, there is an ongoing need to develop new architectures and methods for accurately locating the source of signals, while reducing the amount of data that must be communicated to a central processing station over a communication link for purposes of TDOA analysis.

SUMMARY OF THE INVENTION

The invention concerns a method for identifying a source location of an electromagnetic signal having a known waveform. The method includes positioning three or more monitoring stations at different spaced apart geographic locations, and receiving a signal at each of the three or more monitoring stations from a common source having a source location. A time stamp is applied to a set of samples, a block, acquired from the A/D converter. For every N samples the autocorrelation process is performed using the replica waveform. In this regard, a GPS timing signal can be used to help synchronize the time stamp generator provided in each monitoring station. Further, at each monitoring station, a replica waveform having a characteristic shape and duration that conforms to the known waveform is generated. The replica waveform is generated in each monitoring station for each set of N digital data samples.

Thereafter, an autocorrelation process is used at each of the three or more of monitoring stations to determine a time offset between an occurrence of the known waveform in the signal, and an occurrence of the replica waveform. This autocorrelation process is performed using the replica waveform and each set of N samples. Finally, the time offset is communicated from each of the three or more monitoring stations to a central processor. The central processor, see FIG. 2, 215, calculates a position of the source location using the time offset communicated from each of the three or more of monitoring stations. Significantly, the central processor calculates a time difference of arrival of the signal at each monitoring station based on a difference in the time offsets.

According to one aspect of the invention, the replica waveform is selected so as to have a shape and duration that conforms to a waveform produced by natural phenomena. One such example of natural phenomena that will produce a known waveform is a lightning strike. In this regard, the replica waveform can be selected to have a characteristic shape and duration corresponding to a waveform produced by a cloud-to-ground type lightning strike. Alternatively, the replica waveform can be chosen to have a characteristic shape and duration corresponding to a waveform produced by a cloud-to-cloud type lightning strike. Still, other types of replica waveforms can also be selected. According to another aspect of the invention, the replica waveform is produced exclusive of a noise component. The absence of a noise component in the replica waveform advantageously improves a signal to noise ratio of an autocorrelation result.

In addition to the method described above, the invention also concerns a system for identifying a source location of an electromagnetic signal having a known waveform. The system includes three or more of monitoring stations positioned at different spaced apart geographic locations. Radio receiving equipment is provided at each of the three or more of monitoring stations for receiving and demodulating a radio frequency signal from a common source having a source location. A time stamp generator is provided at each monitoring station. The time stamp generator is provided for applying a time stamp to each block or set of N digital data samples derived from the received signal at each monitoring station. In this regard, a GPS timing signal can be used to help synchronize the time stamp generator provided in each monitoring station. Further, replica generating hardware and/or software is also provided at each of the three or more of monitoring stations. The replica generating hardware and/or software is configured for periodically synchronously generating at each monitoring station a replica waveform as described above.

An autocorrelation processor is also provided at each of the three or more monitoring stations. The autocorrelation processor is configured for performing an autocorrelation process at each of the three or more of monitoring stations. This autocorrelation process is performed using the replica waveform and each set of N samples. The autocorrelation process determines a time offset between an occurrence of the known waveform in the signal, and an occurrence of the replica waveform at each the monitoring station. The system also includes communication devices at each of the three or more of monitoring stations. The communication devices are configured for communicating the time offset from each of the three or more of monitoring stations to a central processor.

The central processor includes hardware and/or software for calculating a position of the source location using the time offset communicated from each of the three or more of monitoring stations. The position calculating hardware and/or software calculates a time difference of arrival of the signal at each monitoring station based on a difference in the time offsets.

A time synchronization sub-system is provided in each of the monitoring stations. The time synchronization sub-system is configured for synchronizing the time stamp generated by each of the time stamp generators. A timing signal from a remote location can be used by the time synchronization sub-system to ensure that the time stamp generator in each monitoring station is synchronized. For example, the timing signal can be a GPS timing signal.

DETAILED DESCRIPTION OF THE PREFERRED EMBODIMENTS

The invention will now be described more fully hereinafter with reference to accompanying drawings, in which illustrative embodiments of the invention are shown. This invention may, however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Figure 1:
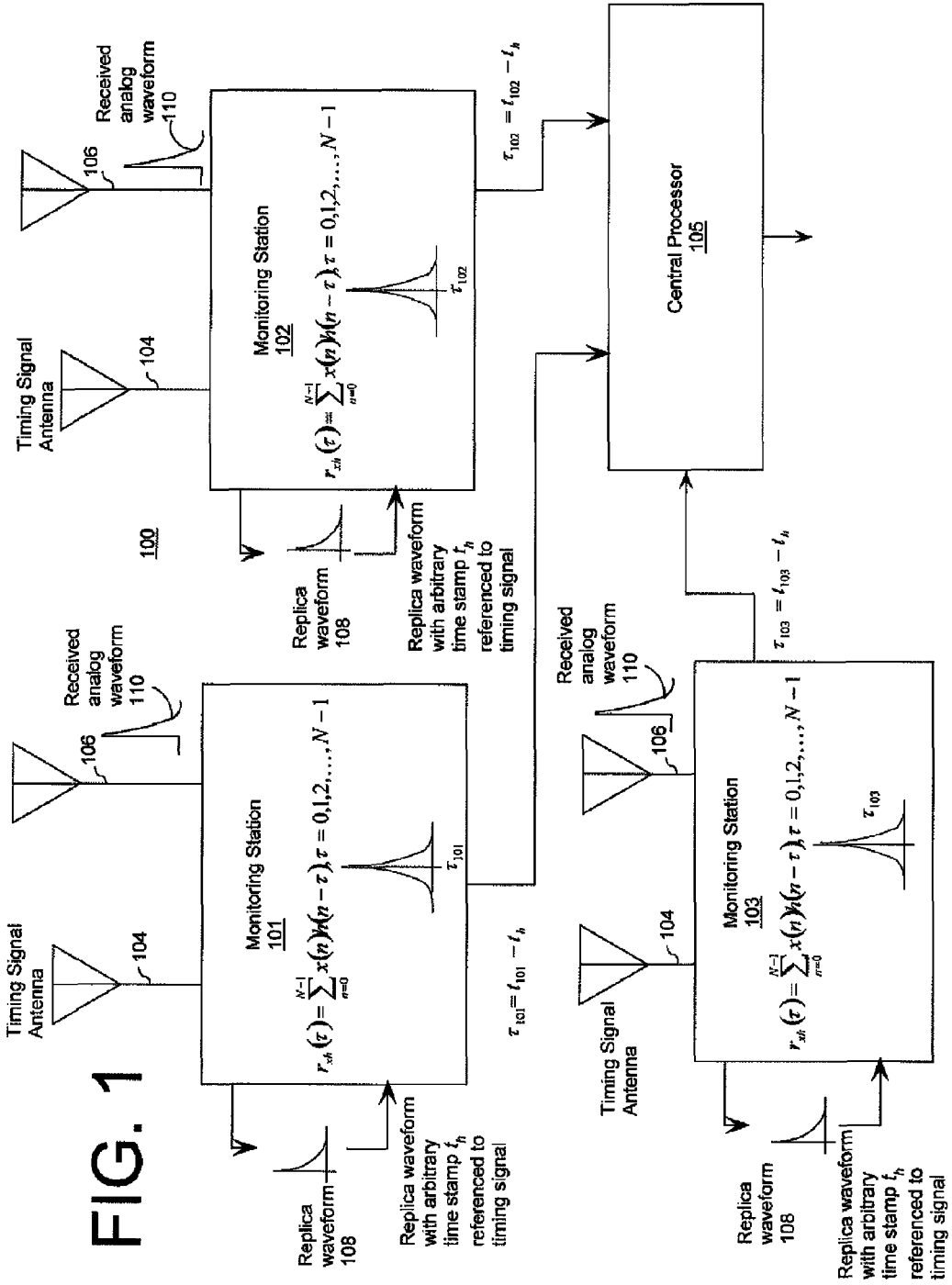
FIG. 1 is conceptual block diagram that is useful for understanding a time difference of arrival system for locating a source of electromagnetic energy.

Shown in FIG. 1 is a block diagram which conceptually illustrates the operation of a time difference of arrival (TDOA) type system 100 for locating a source of an electromagnetic signal having a particular waveform. The system includes three or more monitoring stations 101, 102, 103 positioned at different spaced apart geographic locations. In FIG. 1 only three monitoring stations are shown for convenience. However, it should be understood that three or four monitoring stations are normally preferred for TDOA type systems. Each monitoring station 101, 102, 103 comprises a radio receiver capable of receiving and demodulating electromagnetic energy generated by an RF source which is to be located by the system 100. A receiving antenna 106 is provided at each monitoring station 101, 102, 103 for receiving the electromagnetic energy generated by the RF source.

Each monitoring station 101, 102, 103 is also comprised of a time synchronization system which is used to synchronize a timing generator at each monitoring station. The time synchronization system can include a radio receiver coupled to a timing signal antenna 104 for receiving a time synchronization signal. For example, a GPS timing signal can be received by timing signal antenna 104 for this purpose.

At each monitoring station 101, 102, 103 a replica waveform 108 is applied to each sample block. The replica waveform is selected so that it has a shape and duration which corresponds to the characteristics of a waveforms normally associated with the RF source to be located. According to one embodiment of the invention, the replica waveform is selected so as to have a shape and duration that conforms to a waveform produced by natural phenomena. For example, the system can be configured to identify a location of cloud-to-ground lightning strikes. In that case, the replica waveform is selected to have a shape and duration which corresponds to an impulse response produced by cloud-to-ground lightning. The replica signal is preferably synthesized from a digital representation of the signal that is stored in a memory location at each monitoring station. Techniques for digitally synthesizing a signal waveform from a digital data store are well known in the art. Accordingly, the process for generating the replica waveform 108 will not be described here in detail.

According to a preferred embodiment, the replica waveform can conform to the shape and duration of specific type of lighting strikes. For example, the replica waveform can be selected to conform to the shape and duration of RF signals known to be associated with cloud-to-ground lightning, cloud-to-cloud lighting, or other types of lightning.

Waveforms associated with various types of lightning will vary somewhat from one lightning strike to the next. In this regard, it should be understood that the replica waveform referenced herein will not necessarily be identical to the actual waveform produced in any particular strike. Instead, the replica waveform will have a shape and duration which merely approximates a typical waveform of the type that the system is designed to locate. In this regard, the replica waveform can be modeled based on a number of actual examples of a particular known type of lightning strike using averaging or other mathematical techniques for smoothing a set of measured data samples. The replica waveform data can be stored in digital form in a data store and then used when necessary to reproduce the replica waveform. Waveform synthesis techniques are well known in the art and therefore will not be described here in detail.

The replica waveform is periodically synchronously generated at each monitoring station. A time stamp is assigned to each replica waveform that is periodically generated in this way. The time stamp at each monitoring station 101, 102, 103 is synchronized using the GPS timing signal. Thereafter, the replica waveform and the time stamp referenced to GPS are used for performing an autocorrelation process.

Autocorrelation is a well known mathematical tool that is frequently used to determine the extent to which a particular signal matches a time-shifted version of itself, as a function of the amount of time shift. Autocorrelation is distinguishable from cross-correlation, which typically is used to compare two different signals. In this regard, an autocorrelation can generally be thought of as the cross-correlation of a signal with itself. Autocorrelation and cross-correlation are both well known in the art. In the present invention, the term autocorrelation is used in a slightly different way. As used herein the term autocorrelation refers to a cross-correlation of a received signal with a replica signal. The replica signal is one that has a predetermined shape and duration that is chosen to approximately match the expected shape and duration of the received signal.

An autocorrelation process is performed at each of the monitoring stations using the received waveform from the RF source to be located, and the replica waveform. The purpose of the autocorrelation process is to determine a time offset between an occurrence of said received waveform from the RF source, and an occurrence of the replica waveform at each said monitoring station. Thereafter, the time offset is communicated from each of the monitoring stations to a central processor 105. Referring to FIG. 1, the time offset for monitoring station 101, 102, 103 can be expressed as follows:

$$\tau_{101} = t_{101} - t_h$$

$$\tau_{102} = t_{102} - t_h$$

$$\rho_{103} = t_{103} - t_h$$

Where:

$t_{101}$ is the signal time of arrival at monitoring station 101

$t_{102}$ is the signal time of arrival at monitoring station 102

$t_{103}$ is the signal time of arrival at monitoring station 103

$t_h$ is the arbitrary time of arrival of the replica waveform as defined by the GPS referenced timestamp at monitoring station 101, 102 and 103.

The value of the time offset $\tau_{101}$, $\tau_{102}$, $\tau_{103}$ computed at each monitoring station 101, 102, 103 is communicated to the central processor 105. The central processor uses these values to compute a time difference of arrival (TDOA) at each monitoring station. In particular, the TDOA can be computed by simply taking the difference between the time offset values computed at each monitoring station 101, 102, 103. This concept can be shown as follows:

$$TDOA_{101,102} = \tau_{101} - \tau_{102} = (t_{101} - t_h) - (t_{102} - t_h)$$

$$TDOA_{101,103} = \tau_{101} - \tau_{103} = (t_{101} - t_h) - (t_{103} - t_h)$$

However, because the time stamps are synchronized, the value of $t_h$ will be a constant as between respective monitoring stations 101, 102, 103. Therefore, in the above equations we can substitute the value $t_c$, a constant, in place of the value of $t_h$. The resulting equations are as follows:

$$TDOA_{101,102} = t_{101} - t_c - t_{102} + t_c$$

$$TDOA_{101,103} = t_{101} - t_c - t_{103} + t_c$$

Because $t_c$ is a constant, it cancels out of the foregoing equations, and we are left with the following:

$$TDOA_{101,102} = t_{101} - t_{102}$$

$$TDOA_{101,103} = t_{101} - t_{103}$$

From the foregoing, it will be appreciated that the difference between the time offsets computed at each monitoring station 101, 102, 103 will be equal to the time difference of arrival of the source signal (e.g. from a lightning strike) at each monitoring station.

As noted above, the invention makes use of an autocorrelation process performed at each monitoring station to determine the time offset $\tau_{101}$, $\tau_{102}$, $\tau_{103}$, at each monitoring station 101, 102, 103. This time offset is obtained by using the received waveform 110 from an RF source and a replica waveform 108 that is periodically generated at each monitoring station. The time offset is a timing difference as between the synchronized occurrence of the replica waveform 108 at each monitoring station, and the time when a waveform 110 is respectively received at each monitoring station. The autocorrelation process used to determine the time offset can be defined as follows:

$$r_{xh}(\tau) = \sum_{n=0}^{N-1} x(n) h(n - \tau), \tau = 0, 1, 2, \ldots, N-1$$

where:

x is the received signal h is the expected impulse response of the received signal N is the number of samples collected, and $\tau$ is the time offset or lag In this application, $h(n-\tau)$ is the replica waveform. The value of $\tau$ that maximizes $r_{xh}$ is then the time offset between the signal and the replica.

According to an embodiment of the invention, the replica waveform $h(n-\tau)$ has no noise. This is a significant advantage in the present invention because the absence of noise in the replica signal increases the overall signal to noise ratio (SNR) after autocorrelation. In particular, the output signal to noise ratio obtained after autocorrelation ($SNR_0$) that is obtained with the present invention is given by the following expression:

$$SNR_0 = W \cdot T \cdot SNR_1$$

where:

W is the noise bandwidth of the receiver,

T is the duration of the received signal, and $SNR_1$ is the source signal's signal-to-noise ratio at the receiver.

From the above relationship, it should be noted that the output signal-to-noise ratio $SNR_0$ will be greater in all cases than a corresponding signal-to-noise ratio that could be achieved with a cross-correlation process using three received signals with the same signal-to-noise ratio. This is an important advantage. In fact, if the signal received by monitoring stations 101, 102, 103 is corrupted with additive white Gaussian noise, the filter with the impulse response matched to the signal will have the effect of maximizing the signal to noise ratio.

Significantly, the autocorrelation process described above, which uses a replica waveform, has a further advantage in that it does not require data from a second sensor. This fact is what allows the computation to be performed in each of the remote monitoring stations, without input from any other monitoring station. The ability to perform the autocorrelation function at each remote monitoring station is advantageous because it avoids the necessity of communicating digitized versions of the received signals from the monitoring station. For example, a conventional cross-correlation process would necessitate that a digital representation of the received signals at each monitoring station be communicated to a central processor for performing a cross-correlation. However, that approach requires significantly more bandwidth for transmission of data. The need for large bandwidth communication links between the monitoring stations 101, 102, 103 and the central processor 105 is therefore avoided. Accordingly, the autocorrelation process provides a distinct advantage over alternative methods, performing a cross-correlation based on signals received from multiple sensors.

Figure 2:
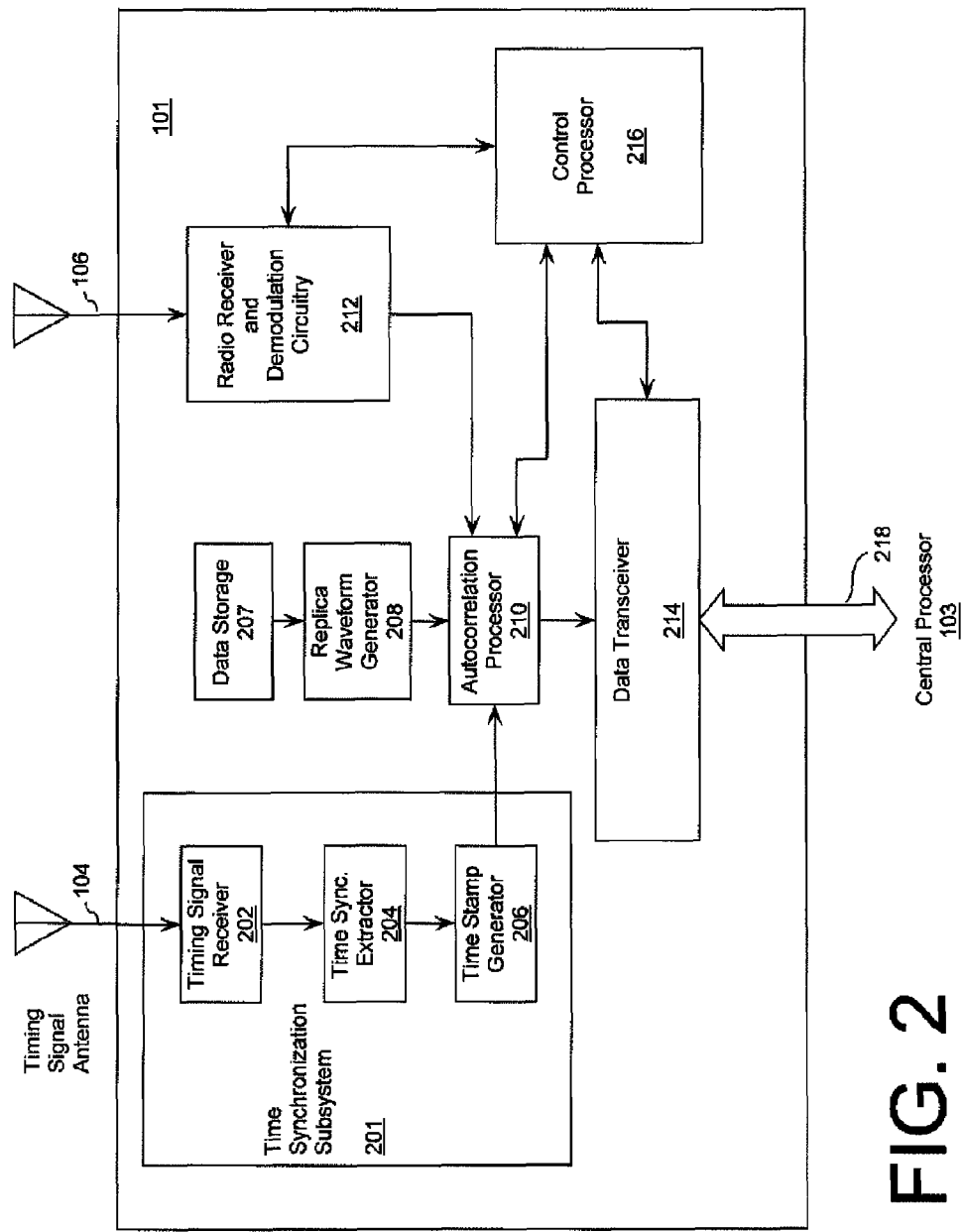
FIG. 2 is a detailed block diagram of a monitoring station that can be used in the present invention.

Referring now to FIG. 2, there is shown a more detailed block diagram of a monitoring station 101. Each of the three or more monitoring stations 101, 102, 103 used in system 100 can advantageously have a configuration similar to that shown in FIG. 2. Monitoring station 101 is comprised of timing signal antenna 104 coupled to a timing synchronization subsystem. The time synchronization sub-system includes a timing synchronization receiver 202 coupled to the timing signal antenna 104. If the system 100 uses GPS signals as a timing reference, then the timing signal antenna 104 and the timing signal receiver are preferably configured for receiving and processing GPS signals from a plurality of earth orbiting satellites. Still, the invention is not limited in this regard and other types of timing signals can also be used without limitation. A time synchronization extractor 204 is provided for extracting timing information from the timing signal. In a system which uses GPS timing signals, the GPS one pulse per second signal is used to correct the frequency of a voltage controlled oscillator. The oscillator drives the A/D's at the sample rate. Each sample from the A/D's can be time tagged as an offset from the last GPS one pulse per second event.

Time stamp generator 206 generates a time stamp that is periodically communicated to the autocorrelation processor 210 which is triggered when the number of samples in a block have been received.

Monitoring station 101 also comprises radio receiver and demodulation circuitry 212. The radio receiver and demodulation circuitry is configured for receiving and demodulating a radio frequency signal from a common source having a source location. The specific design of the radio receiver and demodulation circuitry will vary somewhat depending on the nature of the radio frequency signal generated by the common source. For example, the radio receiver circuitry can be tuned to have a frequency and bandwidth suitable for receiving waveforms produced by the common source.

For lightning detection there is no demodulation process. Only a detection process is used. The radio receiver will include a matched filter block designed to demodulate each symbol which is sent from a transmitter. The matched filter block can essentially be a set of autocorrelation processes each matched to the impulse response of each particular transmitted symbol.

The monitoring station 101 also includes replica generating hardware and/or software. The replica generating hardware and/or software is configured for periodically synchronously generating at each monitoring station a replica waveform as described above. The replica generating hardware can include a data storage device 207. The data storage device 207 can be used to store a digital representation of a replica waveform. The stored replica data can be continuously applied to the autocorrelation process for each input data block without regeneration. In the event that the monitoring station 101 is intended to determine a location of cloud-to-ground lightning strikes, the replica waveform has a shape and duration that conforms to waveforms normally observed for these types of natural phenomena.

The replica wave form is specified by the impulse response of the input waveform, which is the inverse Fourier transform of the frequency-response function. Physically, the impulse response is the output of the filter as a function of time when the input is an impulse or delta function. Therefore the impulse response is the image of the received waveform run backward in time starting from a fixed time.

The monitoring station also includes autocorrelation processor 210. The methods and techniques for performing an autocorrelation are well known in the art and therefore will not be described in detail. However, it should be understood that the autocorrelation processor uses as inputs the replica waveform generated by the monitoring station, and a received waveform from the radio receiver and demodulation circuitry 212. The autocorrelation process determines a time offset between an occurrence of the known waveform in the signal, and an occurrence the replica waveform at each the monitoring station. Accordingly, the output of the autocorrelation processor will include information which defines a timing offset as between the replica waveform and the received waveform. This timing offset information is referred to herein as $\tau$. The value of $\tau$ can be expressed in any suitable digital data format.

The monitoring station 101 communicates the digital data representing the value of $\tau$ to data transceiver 214. The data transceiver 214 can include a modem coupled to a wired or wireless communication link 218 for communicating the digital data representing the value of $\tau$ to the central processor 105.

The central processor 105 includes a computer processor and software configured to calculate a position of the source location using the time offset $\tau$ communicated from each of the three or more of monitoring stations 101, 102, 103. The Central Processor groups the groups of data into time-coincident events using a windowing technique. Then, a location is computed from the delta-times of each of the time-coincident events using a time-of-arrival algorithm. Most time-difference-of-arrival systems use a hyperbolic triangulation technique to determine the location.

Figure 3:
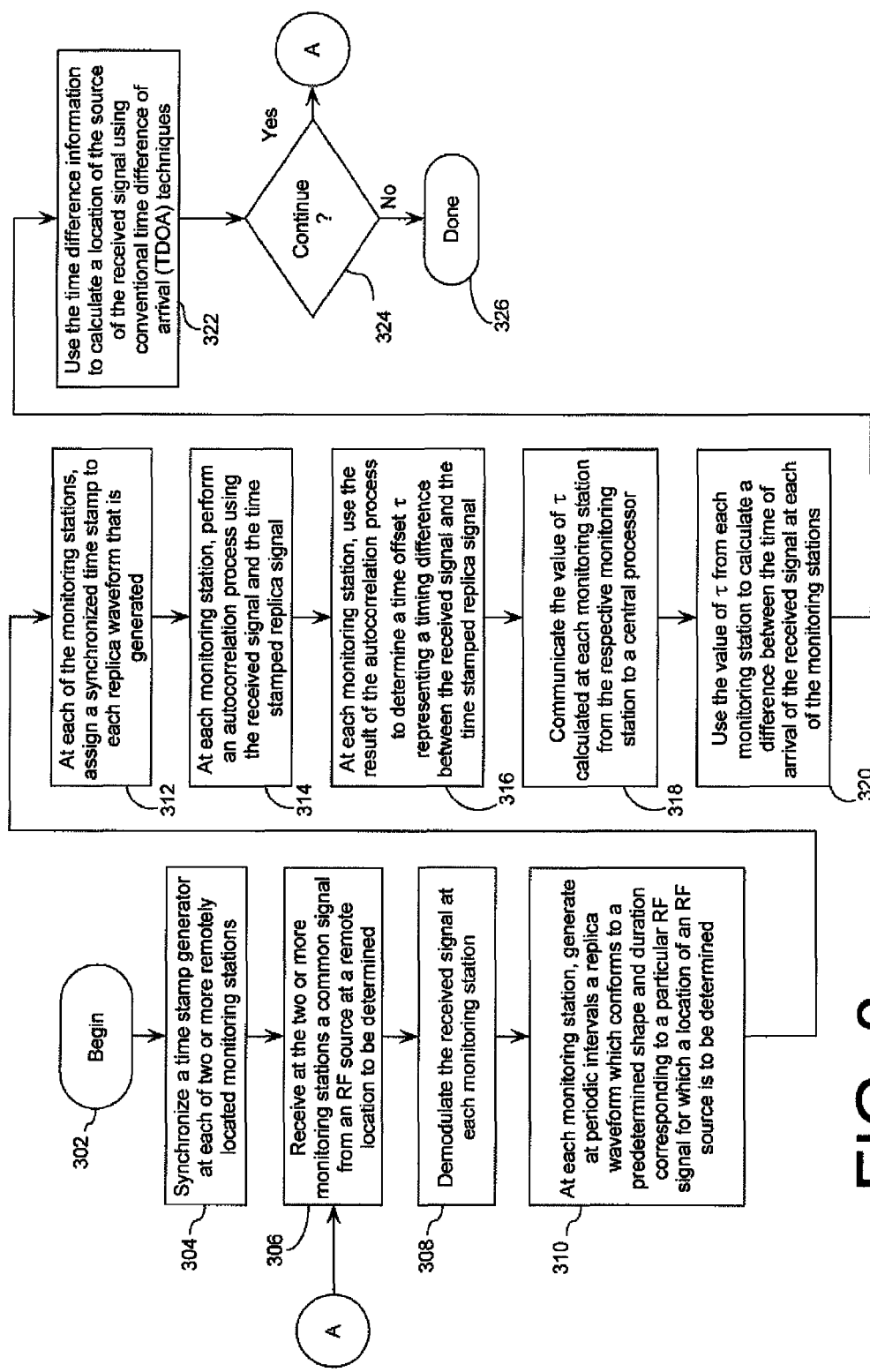
FIG. 3 is a flowchart that is useful for understanding a method or implementing the inventive arrangements.

Referring now to FIG. 3, there is shown a flowchart that is useful for understanding a TDOA method for locating a source of an RF signal, such as a lightning strike. The method begins in step 302 and continues on to step 304. In step 304, a time stamp generator in each of three or more remotely located monitoring stations are synchronized. Various techniques are known in the art for synchronizing a timing of three or more remotely located radio receiver devices. Accordingly, a detailed explanation of the synchronization method is not necessary. However, it should be understood that the degree of precision with which a location of an RF source can be determined will depend in part on how closely the three or more monitoring stations 101, 102, 103 can be synchronized. According to one embodiment, the synchronization process can advantageously be accomplished by using a stable timing signal communicated from a remote reference to each of the monitoring stations. Various timing references can be used for this purpose. For example, it is known in the art that conventional GPS satellite systems transmit a timing signal to terrestrial stations. The GPS timing signal can be utilized for synchronizing the monitoring stations in the present invention. By using GPS timing signals, monitoring stations 101, 102, 103 can be time synchronized to within about 1 microsecond of each other.

In step 308, three or more monitoring stations 101, 102, 103 receive a common RF signal from a remote RF source having a location which is to be determined. For example, the RF source can be a lightning strike and the location to be determined can be a location of the lightning strike. It is understood that the invention is not limited in this regard, and the location of other types of RF signals can also be determined using the methods described herein.

In step 308, each of the three or more monitoring stations 101, 102, 103 demodulates the RF signal that has been received from the common source. Demodulation methods for RF signals are well known in the art and will not be described here in detail. In step 310, a replica waveform is generated at periodic intervals. The replica waveform conforms to a predetermined shape and duration corresponding to signals that are known to be generated by a particular type of RF signal source that the method is intended to locate. For example, if the RF signal source is lightning, then the replica waveform will conform to the shape and duration of RF signals that are known to be generated by lightning. According to a preferred embodiment, the replica waveform can conform to the shape and duration of specific type of lighting strikes. For example, the replica waveform can be selected to conform to the shape and duration of RF signals known to be associated with cloud-to-ground lightning, cloud-to-cloud lighting, or other types of lightning.

After step 310, the method continues on to step 312. In step 312 a synchronized time stamp is assigned or associated with each replica waveform that is correlated with the input data in each of the three or more monitoring stations. In this regard it should be noted that, although it is necessary for the time stamps in each monitoring station to be synchronized, the actual value of the time stamp is unimportant, and can therefore be arbitrary. All that is necessary is for the particular time stamp or time value concurrently assigned to a replica signal in each monitoring station is synchronized and identical.

Following step 312, the method continues on to step 314. In step 314, an autocorellation process is performed at each monitoring station. The autocorrelation process is performed using the received signal (that originated from the common RF source at a location that is to be determined) and the replica signal. Autocorrelation techniques and processing methods are well known in the art. Accordingly, the details of the autocorrelation process will not be described here in detail. Using the autocorrelation equations described above, a time offset value $\tau$ is independently computed in step 316 at each monitoring station 101, 102, 103. This value represents a timing difference between the received signal and the time stamped replica signal. The value of $\tau$ computed at each monitoring station in step 316 is communicated, in step 318, to a central processor 105. In step 320, the value of $\tau$ from each the three or more monitoring station 101, 102 is used to calculate a difference between the time of arrival of the received signal at each of the three or more monitoring stations 101, 102, 103. This process is advantageously performed at the central processor 105.

In step 322, the time difference information computed in step 320 is used to calculate a location of the source of the received signal. This calculation is performed using conventional TDOA processing equations which yield the position of a source based on the TDOA information for the three or more monitoring stations.

In step 324, a determination is made as to whether the processing should continue with respect to other received signals. If so, then the method returns to step 306 where additional signals are received and thereafter analyzed. If no further processing is to be performed, then the process terminates in step 326.

The signal processing and control functions associated with the present invention can be realized in one computer system. Alternatively, the present invention can be realized in several interconnected computer systems. Any kind of computer system or other apparatus adapted for carrying out the methods described herein is suited. A typical combination of hardware and software can be a radio receiving equipment, digital signal processing equipment, and/or a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The invention described and claimed herein is not to be limited in scope by the embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A method for identifying a source location of an electromagnetic signal having a known waveform, comprising:
    positioning a plurality of monitoring stations at different spaced apart geographic locations;
    receiving a signal at each of said plurality of monitoring stations from a common source having a source location;
    periodically synchronously generating at each monitoring station a replica waveform having a characteristic shape and duration that conforms to said known waveform;
    using an autocorrelation process at each of said plurality of monitoring stations to determine a time offset between an occurrence of said known waveform in said signal and an occurrence of said replica waveform at each said monitoring station;
    communicating said time offset from each of said plurality of monitoring stations to a central processor; and
    identifying the source location of the electromagnetic signal having the known waveform, by the central processor, by use of said time offset from each of said plurality of monitoring stations.

2. The method according to claim 1, further comprising calculating at said central processor a position of said source location using said time offset communicated from each of said plurality of monitoring stations.

3. The method according to claim 2, further comprising calculating at said central processor a time difference of arrival of said signal at each monitoring station based on a difference in said time offsets.

4. The method according to claim 1, further comprising selecting said replica waveform to have a shape and duration that conforms to a waveform produced by a lightning strike.

5. The method according to claim 4, further comprising selecting said replica waveform to have a characteristic shape and duration corresponding to a waveform produced by a cloud-to-ground type lightning strike.

6. The method according to claim 4, further comprising selecting said replica waveform to have a characteristic shape and duration corresponding to a waveform produced by a cloud-to-cloud type lightning strike.

7. The method according to claim 1, further comprising selecting said replica waveform exclusive of a noise component to improve a signal to noise ratio of an autocorrelation result.

8. The method according to claim 1, further comprising assigning a time stamp to each occurrence of said replica waveform.

9. The method according to claim 7, further comprising assigning a common time stamp to said replica waveform at each of said monitoring stations.

10. The method according to claim 1, further comprising synchronizing said generating step at each said monitoring station by using a GPS timing signal.

11. A system for identifying a source location of an electromagnetic signal having a known waveform, comprising:

a plurality of monitoring stations positioned at different spaced apart geographic locations;

radio receiving means provided at each of said plurality of monitoring stations for receiving and demodulating a radio frequency signal from a common source having a source location;

replica generating means provided at each of said plurality of monitoring stations and configured for periodically synchronously generating at each monitoring stations a replica waveform having a characteristic shape and duration that conforms to said known waveform;

an autocorrelation processor provided at each of said plurality of monitoring stations configured for performing an autocorrelation process at each of said plurality of monitoring stations to determine a time offset between an occurrence of said known waveform in said signal, and an occurrence of said replica waveform at each of said monitoring station; and communication means at each of said plurality of monitoring stations configured for communicating said time offset from each of said plurality of monitoring stations to a central processor, the central processor configured to identify the source location of the electromagnetic signal having the known waveform by use of the time offset.

12. The system according to claim 11, further comprising position calculating means for calculating at said central processor a position of said source location using said time offset communicated from each of said plurality of monitoring stations.

13. The system according to claim 12, wherein said position calculating means calculates a time difference of arrival of said signal at each monitoring station based on a difference in said time offsets.

14. The system according to claim 11, wherein said replica waveform has a shape and duration that conforms to a waveform produced by a lightning strike.

15. The system according to claim 14, wherein said replica waveform has a characteristic shape and duration corresponding to a waveform produced by a cloud-to-ground type lightning strike.

16. The system according to claim 14, wherein said replica waveform has a characteristic shape and duration corresponding to a waveform produced by a cloud-to-cloud type lightning strike.

17. The system according to claim 11, wherein said replica waveform is exclusive of a noise component to improve a signal to noise ratio of an autocorrelation result.

18. The system according to claim 11, further comprising a time stamp generator at each monitoring station configured for assigning a time stamp to each occurrence of said replica waveform.

19. The system according to claim 17, wherein each said time stamp generator is configured to assign a common time stamp to said replica waveform at each of said monitoring stations.

20. The system according to claim 11, further comprising a time synchronization sub-system in each of said monitoring stations configured for synchronizing said time stamp generated by each of said time stamp generators.

21. The system according to claim 11, wherein said time synchronization sub-system is responsive to a GPS timing signal.

* * * * *